Oct. 19, 1971

K. SENIOR 3,613,195

METHOD OF MAKING FILTER RINGS

Filed April 2, 1969

INVENTOR
Kenneth Senior

3,613,195
Patented Oct. 19, 1971

3,613,195
METHOD OF MAKING FILTER RINGS

Kenneth Senior, Frinton-on-Sea, Essex, England, assignor to Stella-Meta Filters Limited, Laverstoke, near Whitchurch, Hampshire, England
Filed Apr. 2, 1969, Ser. No. 812,633
Claims priority, application Great Britain, Apr. 2, 1968, 15,803/68
Int. Cl. B23p 17/00
U.S. Cl. 29—412                        6 Claims

ABSTRACT OF THE DISCLOSURE

The disclosure is concerned with a method of producing filter rings of the kind comprising an annulus having shallow projections projecting from the face thereof. Waste of metal is avoided by forming the annulus from a wire. The wire is first formed into a helical coil, which is subdivided into its separate convolutions, and each convolution is then flattened. By using a die to achieve flattening, the projections on the annulus may be formed simultaneously.

---

This invention relates to filter rings for use in filtering devices of the kind in which a filter bed of suitable powdered material is formed on a liquid permeable support comprising a series of close packed filter rings encircling a drainage element. Liquid to be filtered is forced through the filter bed, between the rings and passes along the drainage element to an outlet.

Such filter rings are well known and the type with which the present invention is concerned take the form of an annulus having shallow projections projecting from thef ace thereof so as to define, when pressed against the face of a like disc, radial passageways for liquid. The projections are commonly provided on one face only of the annulus and particular filter rings of this type are described in British patent specification No. 1,015,576.

As mentioned in specification No. 1,015,576 such filter rings have been made in the past by stamping from a sheet of metal. This method of making the rings gives rise to waste metal which adds to the cost of the rings.

We have now found that filter rings may be made in a manner which leads to substantially no waste of metal.

According to the invention there is provided a method of manufacturing filter rings of the type referred to hereinbefore, wherein the annulus is produced from a wire by forming the wire into a helical coil, subdividing the coil into its separate convolutions and flattening each convolution.

Preferably and conveniently, the shallow projections of the filter rings of the type referred to hereinbefore are formed on the face of the annulus when each convolution is flattened. This may be acihevied by pressing each convolution between die surfaces to flatten the convolution and at the same time to emboss projections on a face of the annulus formed by flattening.

The method of the invention may be used to produce rings having a rim or ridge which is substantially shallower than the projections, said rim or ridge being formed by an axial extension of the edge of the rings, i.e. in accordance with British patent specification No. 1,015,576. The rim or ridge is also preferably formed when each convolution is flattened. Alternatively the rings may be formed with a sharp edge.

The wire used to form the coil may have any suitable cross-section, for example, it may be rectangular or circular in cross-section, and preferably has the latter cross-section.

The dimensions of the ring produced by the method of the invention are determined by the cross-section of the wire, the diameter of the convolutions of the coil, and the conditions of flattening, and any embossing, if this is done separately. It will usually be convenient to select a particular flattening technique or flattening and embossing techniques for a particular metal and to vary the dimensions of the ring by suitably varying the cross-section of the wire and the diameter of the convolutions of the coil.

The dimensions of the tool used to flatten or flatten and emboss the convolutions should be such as to give a ring in which the two abutting ends are in hard abutment.

The wire may comprise any suitable metal and is preferably a stainless steel wire. More preferably the wire is a stainless steel wire in which the steel is a British Standard EN58B or EN58J stainless steel. Aluminium or titanium wire may be used for special applications.

The method of the invention will now be further described by way of example with reference to the accompanying drawings in which.

Figure 1:
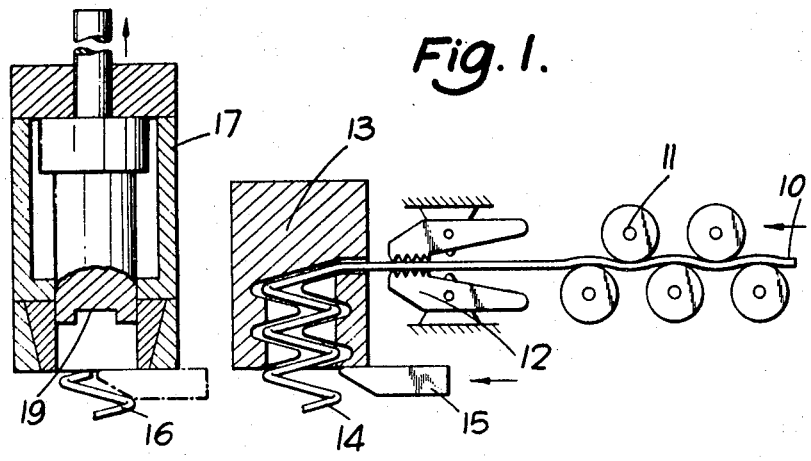
FIG. 1 is a vertical section through one form of apparatus for carrying out the method of the invention.
Figure 2:
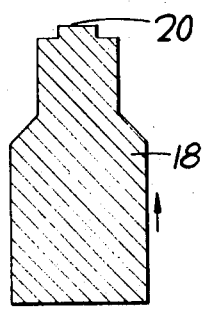
FIG. 2 shows the die of FIG. 1 in the pressing position.
Figure 3:
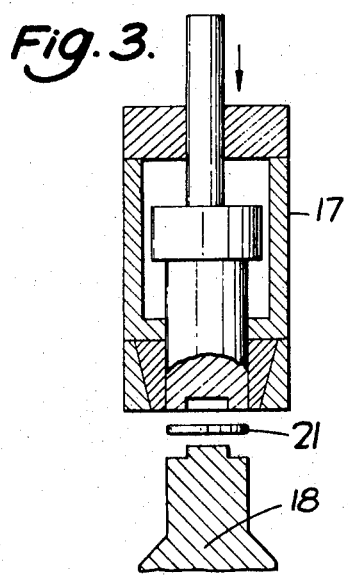
FIG. 3 shows the die of FIG. 1 after pressing.

Referring to FIG. 1, a wire 10 from a coil mounted on a feed reel (not shown) is fed to a five-roll wire straightener 11. After the wire has been straightened it passes through a collet feeder 12 which feeds the wire step-by-step to a coiling die 13. In the coiling die the wire is lubricated with a fluid lubricant and coiled into a helical coil 14. A periodically reciprocating cutter 15 cuts the coil 14 into its individual convolutions 16 as the coil emerges from the bottom of the coiling die. The cutting is effected during the time that the coil is stationary. Each severed convolution is transferred by the cutting mechanism to the position shown in FIG. 2 between press tools 17 and 18. The press tools 17 and 18 have die faces 19 and 20 respectively. The filter ring 21 of FIG. 3 is formed by raising the press tool 18 upwardly as in FIG. 2 to flatten the convolution into an annulus. The die faces 19 and 20 are so shaped that during the flattening operation the surface of the annulus is formed with projections to give a filter ring 21 of the kind referred to.

The die face 19 is formed on a reciprocable part of the press tool 17, so that the completed filter ring 21 may be ejected from the tool as shown in FIG. 3.

What is claimed is:
1. A method for producing a filter ring comprising:
   (a) forming a wire into a helical coil;
   (b) separating each convolution from the coil; and
   (c) forming said ring by pressing each convolution with force sufficient to bring the ends of each convolution into hard abutment while simultaneously forming shallow projections projecting from the ring face, said projections defining radial passages for liquid when the ring is pressed against the face of another like ring.

2. A method as claimed in claim 1, wherein the shallow projections are formed on the face of the ring when each convolution is flattened.

3. A method as claimed in claim 1, wherein each convolution is pressed between die surfaces to flatten it and to emboss projections on the face of the ring formed by flattening.

4. A method as claimed in claim 1, wherein a rim or ridge which is substantially shallower than the projections and which is formed by an axial extension of the edge of each ring is formed when each convolution is flattened.

5. A method as claimed in claim 1, wherein the wire has a circular cross-section.

6. A method as claimed in claim 1, wherein the wire is a stainless steel wire.

(References on following page)

References Cited

UNITED STATES PATENTS

| | | | |
|---|---|---|---|
| 2,042,537 | 6/1936 | Liddell | 210—497.1 |
| 2,249,113 | 7/1941 | Chappuis | 10—73 |
| 2,271,731 | 2/1942 | Chappuis | 10—73 X |
| 2,683,922 | 7/1954 | Zion | 29—412 |
| 3,006,478 | 10/1961 | Mueller | 210—488 X |
| 3,037,633 | 6/1962 | Veitel et al. | 210—488 X |
| 3,195,730 | 7/1965 | Muller | 210—488 |

FOREIGN PATENTS 503,187  4/1939  Great Britain _____ 10—86

JOHN F. CAMPBELL, Primary Examiner

V. A. DiPALMA, Assistant Examiner

U.S. Cl. X.R.

10—85 R, 86; 29—417; 59—12; 140—88, 92.1